United States Patent
Rohweder et al.

[15] 3,669,232
[45] June 13, 1972

[54] RETRACTION SPRING FOR CLUTCHES, BRAKES AND LIKE DEVICES

[72] Inventors: Gerald D. Rohweder, Peoria; Willis E. Windish, Pekin, both of Ill.

[73] Assignee: Caterpillar Tractor Co., Peoria, Ill.

[22] Filed: Sept. 3, 1970

[21] Appl. No.: 69,240

[52] U.S. Cl..................192/85 A, 192/85 AA, 192/89 B, 92/130, 188/216, 188/72.3
[51] Int. Cl........................................F16d 19/00
[58] Field of Search..........................192/85 A, 85 AA, 89 B; 60/54.6 M; 92/130; 188/72.3, 216

[56] References Cited

UNITED STATES PATENTS

| | | | |
|---|---|---|---|
| 2,047,737 | 7/1936 | Lane | 192/89 B |
| 3,204,729 | 9/1965 | Barnes | 188/216 |
| 3,095,950 | 7/1963 | Scheel | 188/216 |
| 2,627,725 | 2/1953 | Cochrane et al. | 192/85 AT |
| 2,980,219 | 4/1961 | Skarie | 192/85 AT |

FOREIGN PATENTS OR APPLICATIONS 725,688    2/1953    Great Britain................192/85 A Primary Examiner—William F. O'Dea
Assistant Examiner—Randall Heald
Attorney—Fryer, Tjensvold, Feix, Phillips & Lempio

[57] ABSTRACT

A clutch or brake comprises at least one annular piston reciprocally mounted therein to be selectively moved to compress an annular pressure plate against a friction disc for clutching or braking purposes. A plurality of circumferentially disposed U-shaped resilient pincher-like retraction springs each comprises parallel first and second leg portions connected together by an intermediate portion. The springs are arranged to have each first leg portion engage the piston to urge it towards its retracted position and away from the pressure plate. In one embodiment of this invention, employing a single piston, the second leg portion of the spring engages in a recess formed on a housing having the piston mounted therein. In a second embodiment, employing two back-to-back pistons each positioned adjacent to a friction disc, each leg portion of the spring engages a respective one of the pistons to urge them towards each other.

11 Claims, 7 Drawing Figures

PATENTED JUN 13 1972
3,669,232
SHEET 1 OF 2
Fig-1-
Fig-2-
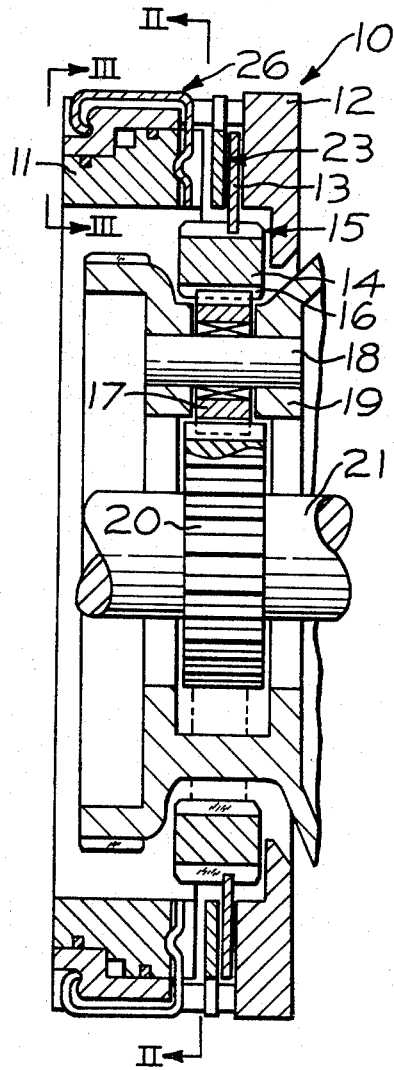
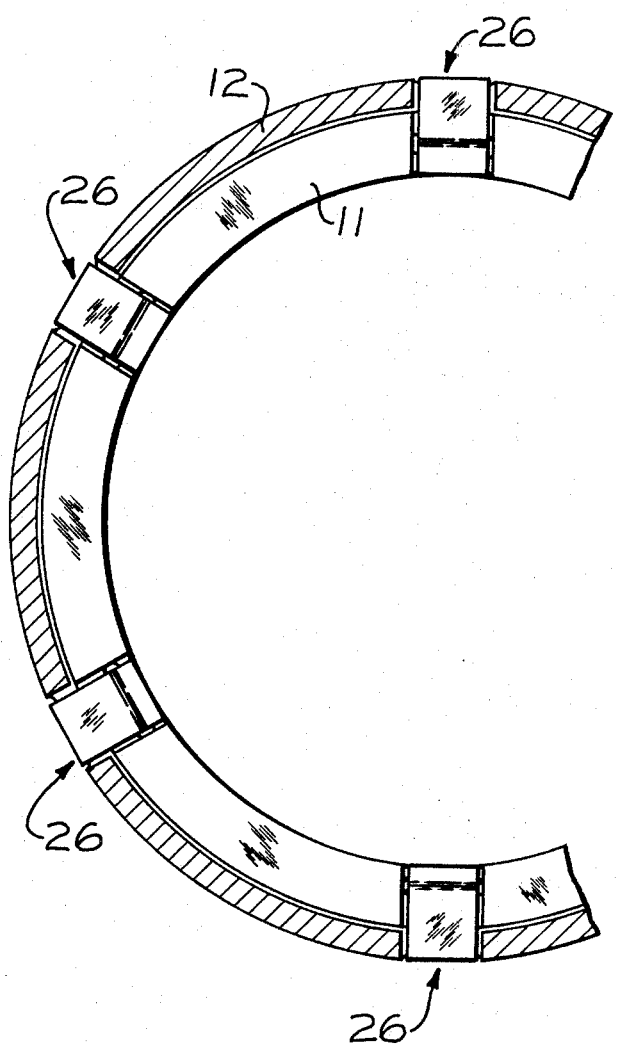
INVENTORS
GERALD D. ROHWEDER
WILLIS E. WINDISH
BY
ATTORNEYS

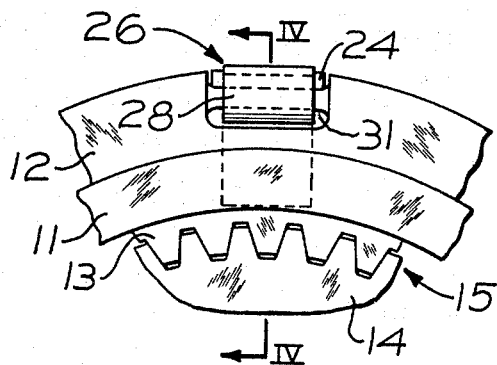
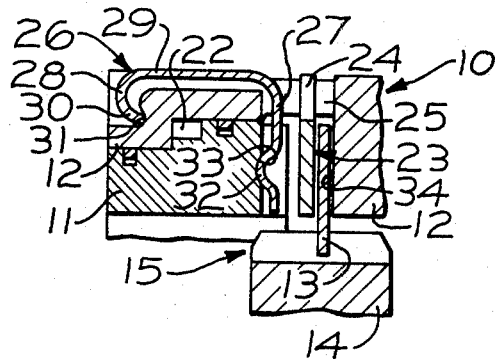
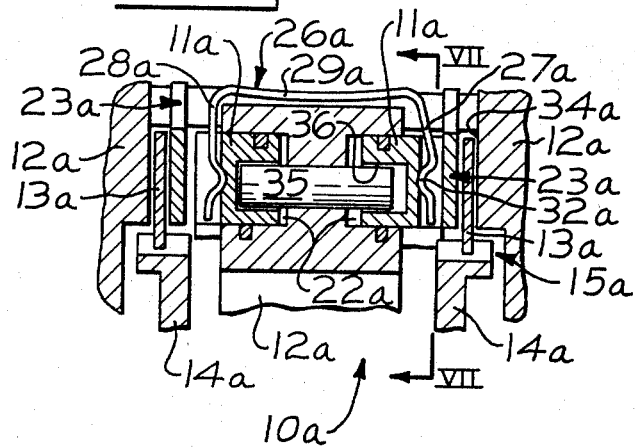
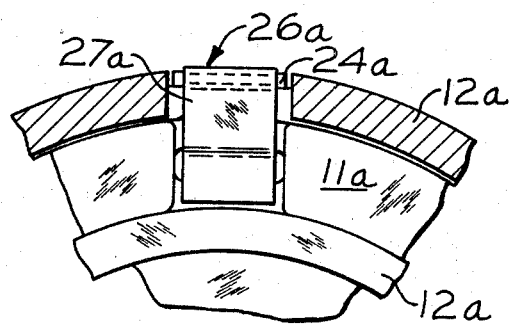
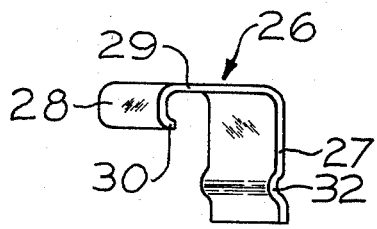

3,669,232

RETRACTION SPRING FOR CLUTCHES, BRAKES AND LIKE DEVICES

BACKGROUND OF THE INVENTION

Conventional clutch and brake assemblies normally comprise coil springs suitably associated with clearance holes, locator seats, etc., for disengagement purposes. In addition to the relative high cost and complexity thereof, replacement of such coil springs generally requires substantial disassembly of the transmission or other device in which they are used. In addition, the integrated clutch or brake assembly is prone to structural failure primarily due to the weakened structures required for spring retention and adaption purposes. Such problems become even more acute with respect to low horsepower transmissions, for example, which have relatively small housings and wherein limited space is provided for the required tie bolts, lube holes and reaction tangs.

BRIEF DESCRIPTION OF THE INVENTION

An object of this invention is to overcome the above, briefly described problems by providing a non-complex and economical clutch, brake or like assembly, employing novel retraction spring means therein, which exhibits a high degree of structural integrity. In addition, such spring means and related hardware are substantially unaffected by centrifugal force, do not interfere with other operating components when installed and can be expeditiously assembled and serviced without completely dismantling the transmission or other device in which they are employed.

The retraction spring means comprises at least one generally U-shaped resilient pincher spring having at least approximately parallel first and second leg portions connected together by an intermediate portion to bias the leg portions apart. The spring is constructed and may be mounted in the device to have its first leg portion positioned to urge a piston towards a retracted position away from a frictional member or disc. In a first described embodiment, the second leg portion engages a housing mounting the piston therein whereas in a second embodiment the second leg portion engage a second piston adapted to selectively compress a second frictional member or disc.

BRIEF DESCRIPTION OF THE DRAWINGS

Further objects of this invention will become apparent from the following description and accompanying drawings wherein:

FIG. 1 is a cross-sectional view of a power transmission employing the retraction spring means of this invention therein;

FIG. 2 is a sectional view taken in the direction of arrows II—II in FIG. 1 with parts removed for clarification purposes;

FIG. 3 is an enlarged fragmentary view taken in the direction of arrows III—III in FIG. 1;

FIG. 4 is a sectional view taken in the direction of arrows IV—IV in FIG. 3;

FIG. 5 is an isometric view of the retraction spring means employed in the FIG. 1 transmission;

FIG. 6 is a partial sectional view similar to FIG. 4 illustrating a modified form of the retraction spring means of this invention employed with a dual piston and friction disc arrangement; and FIG. 7 is a sectional view taken in the direction of arrows VII—VII in FIG. 6.

DESCRIPTION OF THE PREFERRED EMBODIMENTS

FIG. 1 illustrates a clutch, brake or like device 10 having an annular piston 11 reciprocally mounted in a first member or hollow housing 12 thereon. A frictional member or disc 13 is mounted for limited axial movement on a second member, such as a ring gear 14, by means of a "loose" spline connection 15 (FIGS. 1 and 3). Gear teeth 16, formed internally on the ring gear, engage planetary gears 17 which are each rotatably mounted on a stub shaft 18.

The circumferentially spaced stub shafts are each attached to a carrier 19 in a conventional manner. The pinion gears further mesh with a sun gear 20, attached to a shaft 21 suitably mounted for rotation in spaced bearings (not shown). The above gearing arrangement may be employed in a power transmission, final wheel drive or other suitable adapting device.

Referring to FIGS. 3 and 4, piston 11 is reciprocally mounted in housing 12 to define a pressurizable actuating chamber 22 therewith. The chamber is adapted to have a pressurized fluid, such as air or oil, communicated therein by conventional control means (not shown) to selectively move the piston axially rightwardly in FIG. 1. A pressure plate 23 is mounted for limited axial movement on the housing by means of a plurality of radially disposed tangs 24 loosely mounted in mating slots 25 formed in the housing.

This invention is drawn to the utilization of retraction spring means comprising a plurality of circumferentially disposed strap or pincher-type resilient springs 26, each mounted in a slot formed on housing 12 (FIG. 2). Each spring is formed of a single flat plate member of uniform thickness which is stamped or otherwise suitably formed to comprise substantially parallel first and second leg portions 27 and 28, respectively. The leg portions have substantially different lengths and are biased towards each other and connected together by an intermediate portion 29.

Such intermediate portion is mounted on housing 12 to be exposed exteriorly thereof for installation and servicing purposes. The end of the second leg portion is bent inwardly at 30 to form attaching means engaging an annular groove 31 which is cast or otherwise suitably formed on housing 12. The longer first leg portion has an attaching means or ridge 32, formed thereon to oppose bent portion 30, which engages an annular groove 33 formed on piston 11.

The spring may comprise a suitably composed spring steel exhibiting sufficient resiliency to return piston 11 to its retracted position illustrated in FIG. 1 when chamber 22 is depressurized. When the chamber is pressurized, piston 11 will move first leg portion 27 into engagement with pressure plate 23 which in turn compresses friction disc 13 against an annular contacting surface 34 of the housing.

In braking applications, housing 12 will be stationarily mounted in the device to thus prevent rotation of relative rotatable ring gear 14. In clutch applications, the housing may be rotatably mounted in a particular transmission or like device and have drive imparted thereto via sun gear 20, planet gears 17, ring gear 14 and friction disc 13.

FIGS. 6 and 7 illustrate a clutch or brake arrangement 10a employing a dual piston arrangement and a modified retraction spring means embodiment of this invention therein. Like numerals are employed to depict corresponding structures with the FIGS. 6 and 7 numerals being accompanied by an "a." In particular, identical pistons 11a are mounted for reciprocal movement in a housing 12a and define pressurizable chambers 22a therewith.

A guide pin 35 may be attached to housing 12a and is received at each end thereof in a mating bore 36 formed in each piston to prevent rotation thereof. A resilient pincher spring 26a comprises a first leg portion 27a and a co-extensive second leg portion 28a connected together by an intermediate portion 29a. Each of the leg portions has a ridge 32a formed thereon to engage an annular recess formed in the piston.

Thus it can be seen, for example, that when the righthand chamber 22a in FIG. 6 is pressurized that the adjacent piston will move rightwardly to move first leg portion 27a of the spring into engagement with pressure plate 23a to compress a brake or clutch disc 13a against surface 34a of the housing. The clutch disc is mounted for axial movement on a ring gear 14a or the like by means of spline connections 15a. The integrated system would be designed to engage the friction discs separately and also simultaneously.

What is claimed is:

1. A clutch, brake or like device having retraction spring means comprising at least one resilient pincher spring formed of a single flat plate member having a substantially uniform thickness and generally U-shaped cross section throughout its entire length, said pincher spring comprising at least approximately parallel first and second leg portions connected together in spaced relationship by an intermediate portion, said spring constructed to resiliently bias said first and second legs towards each other, at least one piston reciprocally mounted in a member and a relatively rotatable friction disc mounted for axial movement on a ring gear and positioned adjacent to said piston, a portion of said member positioned adjacent to said friction disc to be selectively engaged thereby, the first leg portion of said pincher spring operatively connected to said piston to urge said piston towards a retracted position away from said friction disc.

2. The invention of claim 1 wherein said first leg portion is substantially longer than said second leg portion.

3. The invention of claim 1 wherein the lengths of said first and second leg portions are substantially equal.

4. The invention of claim 1 wherein each of said first and second leg portions have means integrally formed thereon to oppose each other for attaching said spring in said device and are normally disposed substantially perpendicular relative to said intermediate portion.

5. The invention of claim 1 wherein two of said pistons are reciprocally mounted in said member in back-to-back relationship, the first and second leg portions of said pincher spring operatively connected to a respective one of said pistons to urge them towards each other, and a friction disc operatively associated with each of said pistons.

6. The invention of claim 5 further comprising means operatively connected to said pistons and said member for preventing relative rotation therebetween.

7. The invention of claim 1 further comprising means defining a pressurizable chamber with said piston and said member adapted to be selectively pressurized to move said piston towards said friction disc against the biasing force of said first leg portion and a pressure plate mounted for limited axial movement on said member and positioned between the first leg portion of said spring and said friction disc.

8. The invention of claim 1 wherein said device is a clutch and said member and ring gear are mounted for relative rotational movement in said device.

9. The invention of claim 1 wherein said device is a brake, said ring gear mounted for rotational movement in said device and said member stationarily mounted in said device.

10. The invention of claim 1 wherein said first member comprises a hollow housing having means forming a plurality of circumferentially disposed slots formed on the periphery thereof, one of said pincher springs mounted in each of said slots to have the intermediate portion thereof exposed exteriorly of said housing.

11. In a clutch, brake or like device, retraction spring means comprising at least one generally U-shaped resilient pincher spring formed of a single member, said pincher spring comprising at least approximately parallel first and second leg portions connected together in spaced relationship by an intermediate portion, said spring constructed to resiliently bias said first and second legs towards each other, said device further comprising at least one piston reciprocally mounted in a first member thereof, and a relatively rotatable frictional member mounted on a second member and positioned adjacent to said piston, a portion of said first member positioned adjacent to said frictional member to be selectively engaged thereby, the first leg portion of said pincher spring operatively connected to said piston to urge said piston towards a retracted position away from said frictional member, said first member comprising a hollow housing having means forming a plurality of circumferentially disposed slots on the periphery thereof, one of said pincher springs mounted in each of said slots to have the intermediate portion thereof exposed exteriorly of said housing.

* * * * *